United States Patent
Di et al.

(10) Patent No.: US 8,553,615 B2
(45) Date of Patent: *Oct. 8, 2013

(54) METHOD AND SYSTEM FOR PROCESSING BEARER UNDER ISR MECHANISM

(75) Inventors: Zhiyu Di, Shenzhen (CN); Wenfu Wu, Shenzhen (CN); Shanshan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 571 days.

This patent is subject to a terminal disclaimer.

(21) Appl. No.: 12/835,483

(22) Filed: Jul. 13, 2010

(65) Prior Publication Data

US 2010/0278113 A1    Nov. 4, 2010

Related U.S. Application Data (63) Continuation of application No. PCT/CN2009/070163, filed on Jan. 15, 2009.

(30) Foreign Application Priority Data

Feb. 4, 2008  (CN) .......................... 2008 1 0006272

(51) Int. Cl.
  *H04L 1/00*    (2006.01)
  *H04L 12/26*   (2006.01)
  *H04W 4/00*    (2009.01)
  *H04W 36/00*   (2009.01)

(52) U.S. Cl.
  USPC ............ 370/328; 370/331; 370/236; 455/436

(58) Field of Classification Search
  USPC .......................... 370/236, 328, 331; 455/436
  See application file for complete search history.

(56) References Cited

U.S. PATENT DOCUMENTS

| | | | |
|---|---|---|---|
| 2003/0046382 A1* | 3/2003 | Nick | 709/224 |
| 2007/0041360 A1* | 2/2007 | Gallagher et al. | 370/352 |
| 2008/0255991 A1 | 10/2008 | Wang | |
| 2010/0296453 A1 | 11/2010 | Grahn et al. | |
| 2010/0309886 A1 | 12/2010 | Vikberg et al. | |

FOREIGN PATENT DOCUMENTS

| | | |
|---|---|---|
| CN | 1658542 A | 8/2005 |
| CN | 1798204 A | 7/2006 |
| CN | 1917457 A | 2/2007 |

(Continued)

OTHER PUBLICATIONS

Written Opinion of the International Searching Authority issued in corresponding PCT Patent Application No. PCT/CN2009/070163, mailed Apr. 23, 2009.

(Continued)

*Primary Examiner* — Ronald Abelson (57) ABSTRACT

A method and a system for processing a bearer under an idle mode signaling reduction (ISR) mechanism are provided. The method for processing a bearer under an ISR mechanism includes the following steps. A mobility management network element acquires an access mode of a current network. The mobility management network element notifies a serving gateway (SGW) of the access mode of the current network, so that the SGW processes bearer according to the access mode of the current network. It can be ensured that the access mode of the current network is consistent with the access mode for a policy and charging control (PCC) strategy adopted during a bearing procedure under the ISR mechanism.

15 Claims, 8 Drawing Sheets

(56) References Cited

FOREIGN PATENT DOCUMENTS

| CN | 101039506 A | 9/2007 |
|---|---|---|
| CN | 100581297 C | 1/2010 |
| WO | WO 2007/019799 A1 | 2/2007 |
| WO | WO 2007/107088 A1 | 9/2007 |
| WO | WO 2009/097775 A1 | 8/2009 |

OTHER PUBLICATIONS

Extended European Search Report issued in corresponding European Patent Application No. 09707138.5, mailed Dec. 2, 2010.
Huawei, "Discussion on the Rest Open Issues in ISR", 3GPP TSG SA WG2 Meeting #60, Kobe Japan. Oct. 8-12, 2007.
Catt, "Paging Flow for the ISR", 3GPP TSG SA WG2 Meeting #61, Ljubljana, Slovenia. Nov. 12-16, 2007.
$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8), Global System for Mofile Communications. 3GPP TS 23.401, V8.0.0. Dec. 2007.
$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8), Global System for Mofile Communications. 3GPP TS 23.401, V8.1.0. Mar. 2008.
International Search Report in corresponding PCT Application No. PCT/CN2009/070163 (Apr. 23, 2009).
Extended European Search Report in corresponding European Application No. 11181892.8 (Oct. 14, 2011).
Corresponding U.S. Appl. No. 13/215,688 (Sep. 9, 2011).
Corresponding U.S. Appl. No. 13/103,547 (Sep. 9, 2011).

* cited by examiner

METHOD AND SYSTEM FOR PROCESSING BEARER UNDER ISR MECHANISM

CROSS-REFERENCE TO RELATED APPLICATIONS

This application is a continuation of International application No. PCT/CN2009/070163, filed on Jan. 15, 2009, which claims priority to Chinese Patent Application No. 200810006272.7, filed on Feb. 4, 2008, both of which are hereby incorporated by reference in their entireties.

TECHNICAL FIELD

The present disclosure relates to the field of mobile communication technology, and particularly to a method and a system for processing a bearer under an idle mode signaling reduction (ISR) mechanism.

BACKGROUND

A core network of a wireless evolution network mainly includes three logic function entities, namely, a mobility management entity (MME), a serving gateway (SGW), and a packet data network gateway (PGW). The MME, as a mobility management network element, is responsible for functions such as signaling encryption, roaming, tracking, assignment of temporary subscriber identities and security functions, and the MME corresponds to a control plane part a General Packet Radio Service (GPRS) support node inside a current system. The SGW is responsible for local mobile anchor points and mobile anchor points inside a system and lawful interception of relevant information. The PGW is responsible for policy execution and charging and lawful interception of relevant functions. The policy execution and charging is on the basis of a policy and charging control (PCC) rule, which is delivered to the PGW by a policy and charging rules function (PCRF) entity. As the PCRF entity delivers the PCC rule, the PCC rule needs to be determined according to a current radio access type (RAT) of a user. Different RATs may deliver different PCC rules.

Signaling reduction, also called idle mode signaling reduction, can function to reduce signaling over air interface only if the user equipment (UE) is in an idle mode. If an ISR mechanism is adopted for 2G and/or 3G, the user plane in the idle mode is terminated at the SGW. Therefore, under the case that a signaling reduction mechanism is initiated at the user and the network side, the network side cannot know the specific network of the user is 2/3G or a Local Term Evolution (LTE).

In the ISR mechanism, when the user in 2/3G is in IDLE mode, and handovers from a source side 2/3G network to a target side LTE network, since the PGW knows nothing of the user state, and still holds the PCC policy corresponding to the access of the source side 2/3G network, and at this time, the IDLE mode user may possibly be in the LTE access network. If the PGW initiates bearer establishing/modifying/deleting procedure, after the MME pages the user, the bearer establishing/modifying/deleting process will be executed at the side of the LTE, thereby successfully establishing/modifying/deleting the bearer. However, the PCC policy on which the establishing/modifying/deleting process of the bearer initiated by the PGW is based is directed to the access mode of 2/3G.

In the conventional art, under the ISR mechanism, when the network side initiates the bearer establishing/modifying/deleting process for the IDLE user, the access mode to which the PCC policy directed may possibly be inconsistent with the access mode of the resident network of the user.

SUMMARY

The exemplary embodiments described below provide a method and a system for processing a bearer under an ISR mechanism, which can ensure that an access mode in a bearing procedure under the ISR mechanism is consistent with an access mode of a current network of a user.

An embodiment provides a method for processing a bearer under an ISR mechanism, which includes the following steps.

An access mode of a current network is acquired.

The access mode of the current network is notified to an SGW, so that the SGW performs bearer processing according to the access mode of the current network.

Another embodiment provides a mobile network system, which includes a mobility management network element and an SGW.

The mobility management network element is configured to acquire an access mode of a current network.

The SGW is configured to acquire the access mode of the current network from the mobility management network element, and perform a bearing procedure according to the access mode of the current network.

Yet another embodiment provides a mobility management network element, which includes an acquisition unit and a notification unit.

The acquisition unit is configured to acquire the access mode of the current network.

The notification unit is configured to notify the SGW of the access mode of the current network acquired by the acquisition unit.

Still another embodiment provides an SGW, which includes a receiving unit and a bearer processing unit.

The receiving unit is configured to receive the access mode of the current network sent by the mobility management network element.

The bearer processing unit is configured to perform bearer processing according to the access mode of the current network received by the receiving unit.

Regarding the method and system for processing a bearer under an ISR mechanism provided in the embodiments, the mobility management network element firstly acquires the access mode of the current network and notifies the SGW of the acquired access mode, and the SGW then performs the bearing procedure according to the acquired access mode of the current network. Therefore, the problem that the access mode to which the PCC policy adopted by the network side directed during a bearing procedure is inconsistent with the access mode of the current network can be avoided, which is caused because the network cannot know the access technique of the current network.

DETAILED DESCRIPTION OF THE EMBODIMENTS

The exemplary embodiments described below provide a method and a system for processing a bearer under an ISR mechanism. In order to make the technical solutions clearer and more comprehensible, embodiments with reference to the accompanying drawings are described.

Figure 1A:
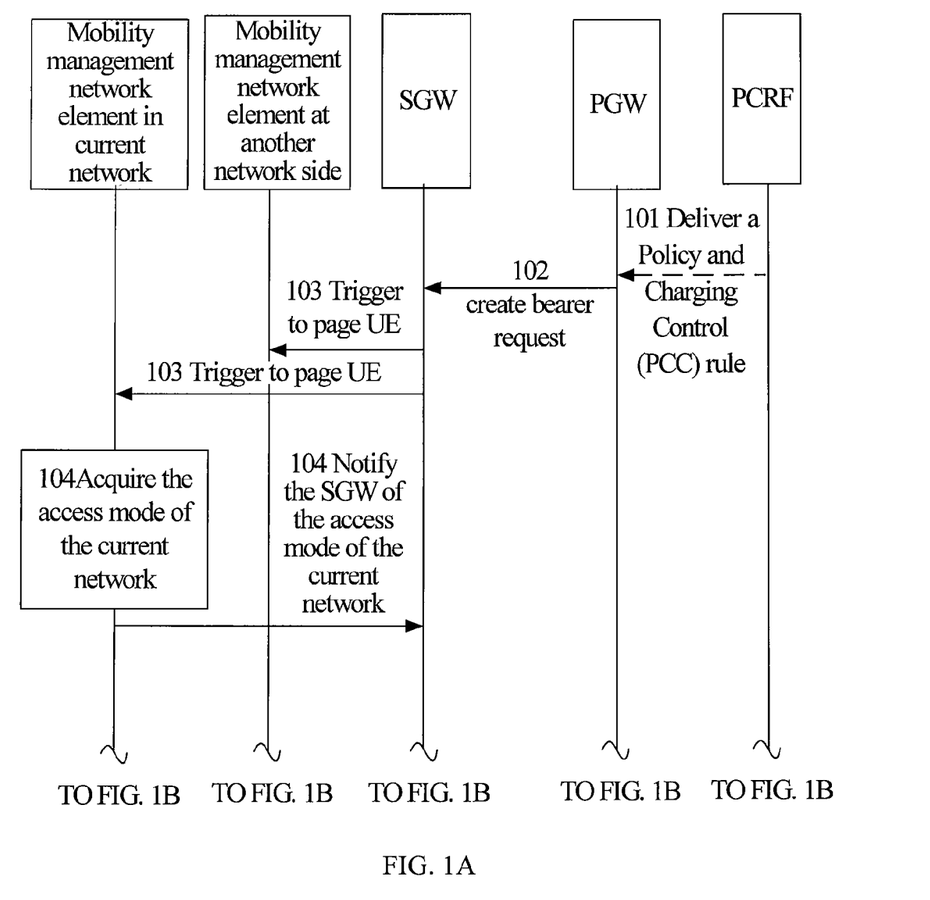
FIG. 1 is a signaling flow chart of a method for processing a bearer under an ISR mechanism according to a first embodiment.
Figure 1B:
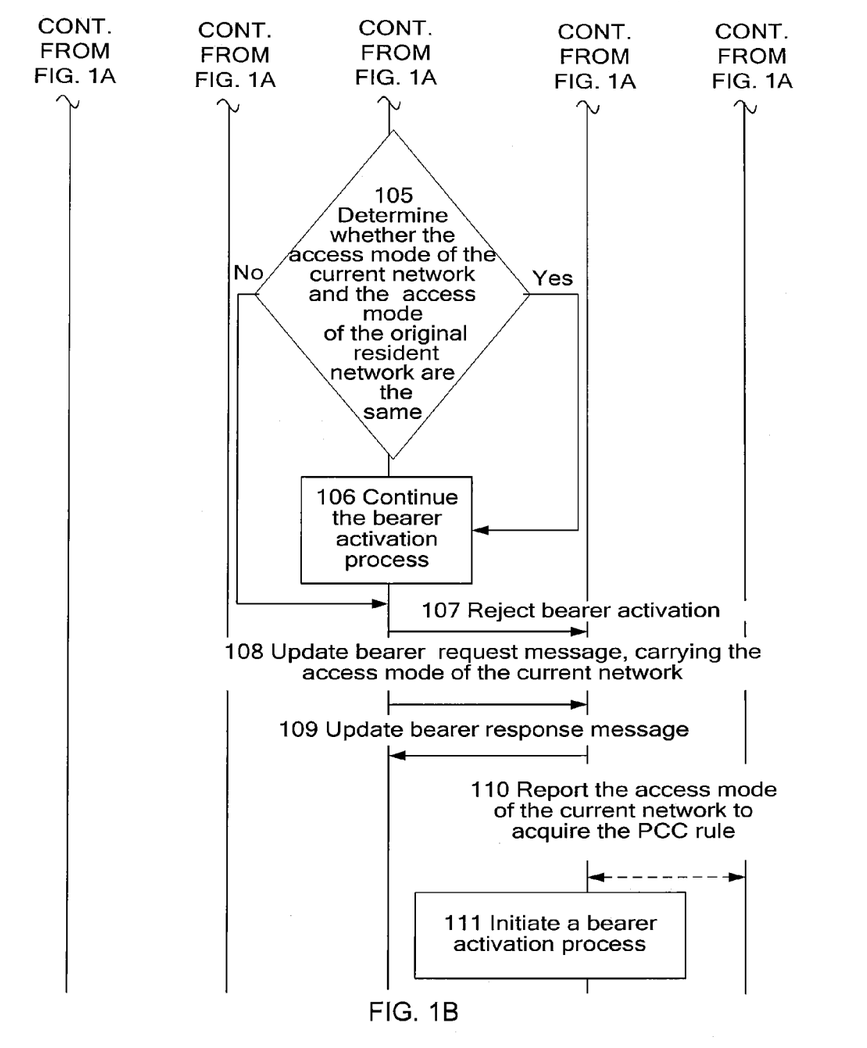

Referring to FIG. 1, a signaling flow chart of a method for processing a bearer under an ISR mechanism according to a first embodiment is shown. The bearer processing procedure may be a bearer activation or processing procedure. In this embodiment, the bearer activation procedure under an ISR mechanism is described. User equipment (UE) in an IDLE state is moved from an previous resident network to a current network.

The process of initiating a bearer activation procedure under the ISR mechanism specifically includes the following steps.

In step 101, a PCRF delivers a PCC rule to a PGW.

The PCC rule is a PCC rule corresponding to an access mode of the previous resident network.

If the PCC rule is not configured by the PCRF, a Quality of Service (QoS) rule may also be configured by the PGW.

In step 102, the PGW, according to the PCC rule, sends a create bearer request to an SGW.

The aforementioned is the bearer activation process triggered by the PGW.

The PCRF may also directly deliver the PCC rule to the SGW to trigger the bearer activation process, or the SGW configures the QoS rule.

In step 103, after confirming that the UEs at access modes of a source side and a target side are in an IDLE state, the SGW stores the create bearer request, and notifies a mobility management network element in the current network and a mobility management network element at another network side to initiate a UE paging procedure.

The mobility management network element above may be a Mobility Management Entity (MME) or a Service GPRS Support Node (SGSN).

In this embodiment, the SGW may notify the mobility management network element in the current network and the mobility management network element in the previous resident network to initiate paging through a downlink data notification message or another new message.

In step 104, after receiving a service request from the UE, the mobility management network element in the current network acquires the access mode of the current network, and notifies the SGW of the access mode of the current network.

The mobility management network element in the current network may also acquire the access mode of the current network by other means. For example, the mobility management network element in the current network sends a message of acquiring the access mode of the current network to the current network, and the current network returns a response message carrying the access mode of the current network.

In Step 105, the SGW compares the acquired access mode of the current network with the recorded access mode of the previous resident network to determine whether they are the same. If yes, the process proceeds to step 106; otherwise, the process proceeds to step 107.

The SGW stores the access mode of the previous resident network therein.

In step 106, the SGW extracts the stored create bearer request and continue the bearer activation process.

For example, the current network and the previous resident network are both 2G/3G networks.

Since the bearer activation process is substantially the same as the bearer activation process in the prior art, it will not be described in detail here.

In step 107, the SGW returns a response message for rejecting bearer activation to the PGW.

The response message for rejecting bearer activation may carry the access mode of the current network.

Specifically, the SGW may carry the access mode of the current network as a parameter in the response message for rejecting bearer activation and send it to the PGW. The response message for rejecting bearer activation may further carry a content indicating that the access mode of the current network is inconsistent with the access mode of the previous resident network recorded in the PGW, for example, indicating that the access mode stored in the PGW is inconsistent with the current access mode in the value of cause.

In step 108, the SGW sends an update bearer request to the PGW, which carries the access mode of the current network.

For example, the current network is a 2G/3G network, and the previous resident network is an LTE network. Thus, the update bearer request message sent by the SGW to the PGW carries the access mode of the current 2G/3G network.

Specifically, the SGW may carry the access mode of the current network as a parameter in the update bearer request message and send it to the PGW. The update bearer request message may further carry a content indicating that the access mode of the current network is inconsistent with the access mode of the previous resident network recorded in the PGW, for example, indicating that the access mode stored in the PGW is inconsistent with the current access mode in the value of cause.

When the SGW is connected to multiple packet data networks (PDNs), it sends the update bearer request message to multiple PGWs.

In step 109, the PGW returns an update bearer response message to the SGW.

In step 110, the PGW sends the access mode of the current network to the PCRF, and acquires the PCC rule corresponding to the access mode of the current network from the PCRF.

In step 111, the PGW initiates a bearer activation process according to the acquired PCC rule corresponding to the access mode of the current network.

If, in steps 101-102, the PCRF directly delivers the PCC rule to the SGW to trigger the bearer activation process, the process from step 107 to step 111 is as follows. The SGW sends the access mode of the current network to the PCRF, and the PCRF sends the PCC rule corresponding to the access mode of the current network to the SGW and the PGW. The SGW initiates the bearer activation process according to the PCC rule corresponding to the access mode of the current network.

The present disclosure is applicable to not only the bearer activation procedure in the embodiment, but also bearer modifying and deleting procedures, which are substantially similar to the bearer activation procedure and will not be further described here.

Figure 2A:
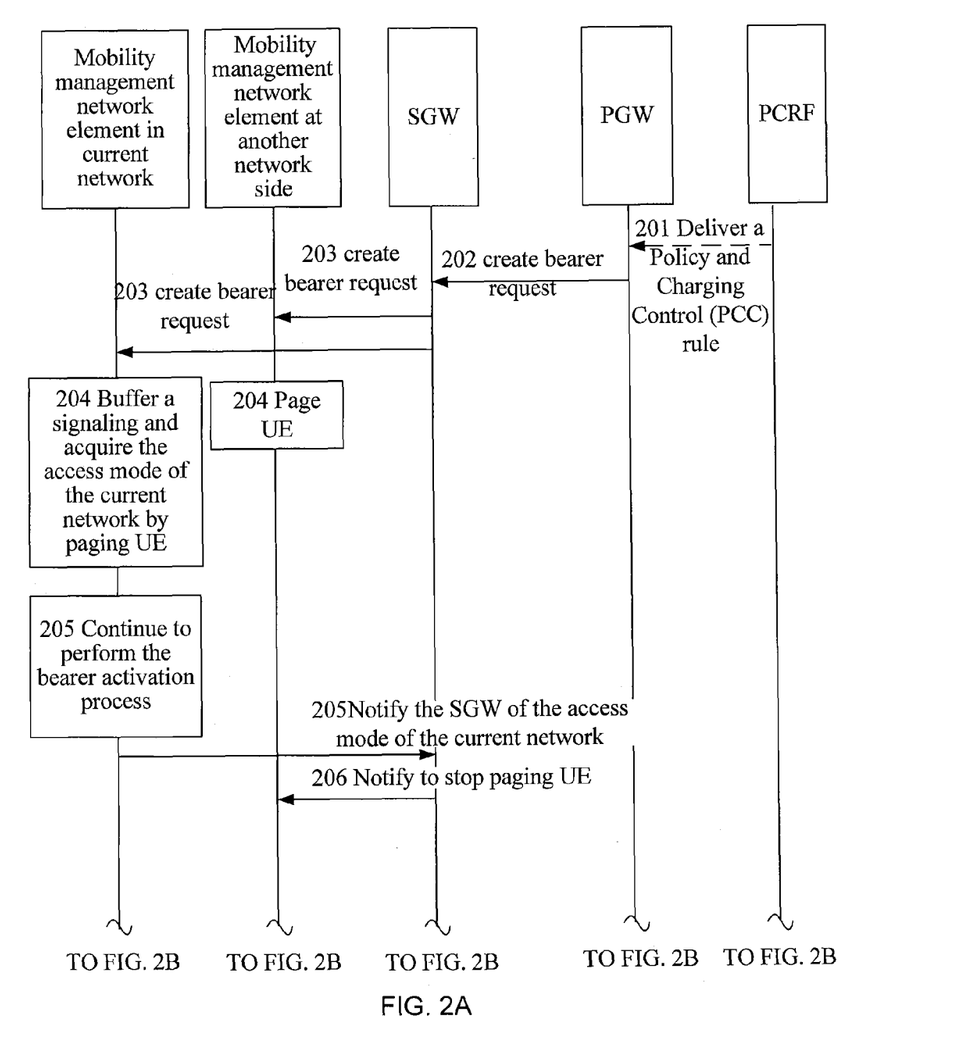
FIG. 2 is a signaling flow chart of a method for processing a bearer under an ISR mechanism according to a second embodiment.
Figure 2B:
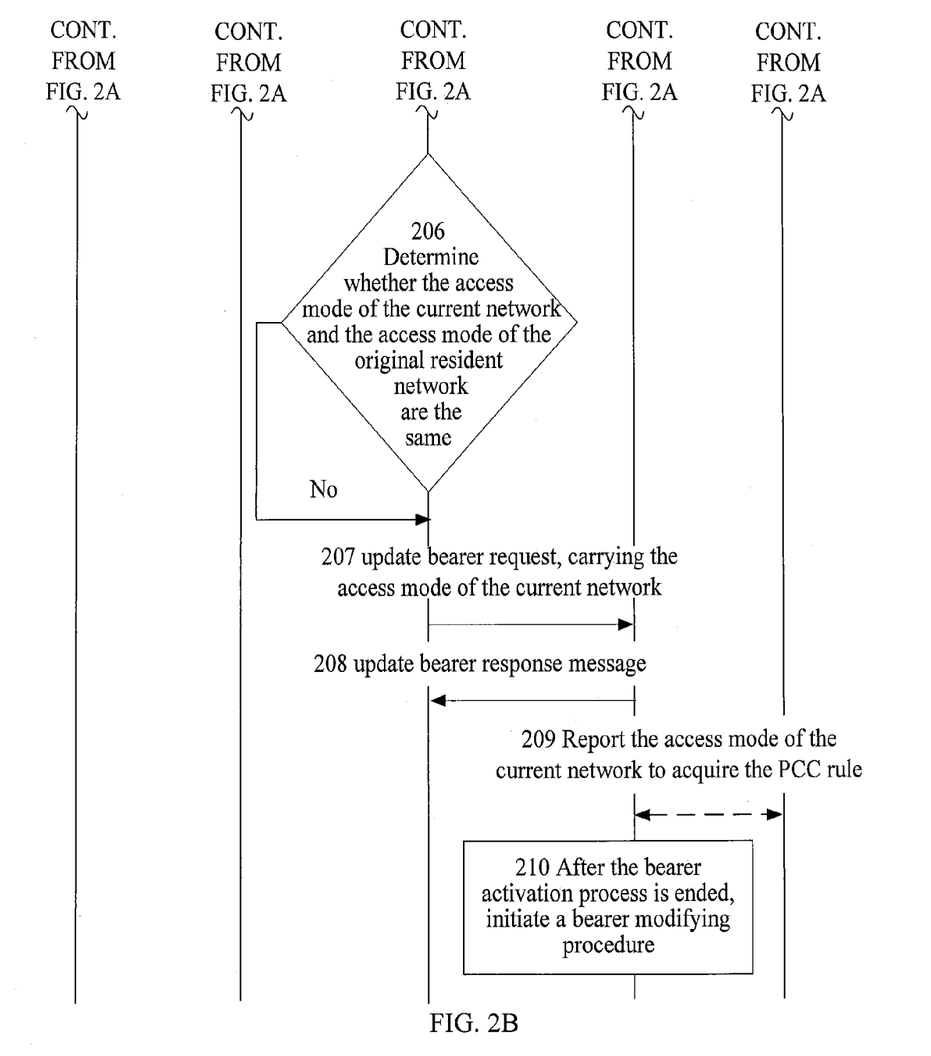

Referring to FIG. 2, a signaling flow chart of a method for processing a bearer under an ISR mechanism according to a second embodiment is shown. The bearer processing procedure may be a bearer initiating or processing procedure. This embodiment is still described according to the bearer activation procedure under the ISR mechanism. UE in an IDLE state is moved from an previous resident network to a current network.

The specific signaling flow of initiating a bearer activation procedure under the ISR mechanism includes the following steps.

In step 201, a PCRF delivers a PCC rule to a PGW.

The PCC rule is a PCC rule corresponding to an access mode of the previous resident network.

If the PCC rule is not configured by the PCRF, a QoS rule may also be configured by the PGW.

In step 202, the PGW, according to the PCC rule, sends a create bearer request to an SGW.

The PCRF may also directly deliver the PCC rule to the SGW to trigger the bearer activation process, or the SGW configures the QoS rule.

In step 203, if the SGW finds that the user is in an IDLE state in two access modes under the ISR mechanism, it sends a create bearer request to a mobility management network element in the current network and a mobility management network element in the previous resident network.

In step 204, the mobility management network element in the current network and the mobility management network element in the previous resident network firstly store signaling and then page the user, and the mobility management network element in the current network acquires the access mode of the UE after receiving the service request of the UE.

The mobility management network element of the current network may also acquire the access mode of the current network by other means, for example, sending a message of acquiring the access mode of the current network to the current network, and the current network returns a response message carrying the access mode of the current network.

In step 205, the mobility management network element of the current network continues performing the bearer activation process, and sends an update bearer request message to the SGW. The update bearer request message carries the access mode of the current network, and the SGW returns an update bearer response message to the mobility management network element of the current network.

In step 206, the SGW notifies the mobility management network element of the previous resident network to stop paging the user, and stop processing the previously received create bearer request. The SGW compares the access mode of the current network with the access mode of the previous resident network to determine whether they are the same. If they are not the same, the process proceeds to step 207.

The SGW stores the access mode of the previous resident network therein.

In step 207, the SGW sends the update bearer request message to the PGW.

The update bearer request message may carry the access mode of the current network.

Specifically, the SGW may carry the access mode of the current network as a parameter in the update bearer request message and send it to the PGW. The update bearer request message may further carry a content indicating that the access mode of the current network is inconsistent with the access mode of the previous resident network recorded in the PGW, for example, indicating that the access mode stored in the PGW is inconsistent with the current access mode in the value of cause.

When the SGW is connected to multiple PDNs, it sends the update bearer request message to multiple PGWs.

In step 208, the PGW returns an update bearer response message to the SGW.

In step 209, the PGW sends the access mode of the current network to the PCRF, and acquires the PCC rule corresponding to the access mode of the current network from the PCRF.

In step 210, after the bearer activation process is ended, the PGW initiates a bearer modifying process according to the acquired PCC rule corresponding to the access mode of the current network.

If, in steps 201-202, the PCRF directly delivers the PCC rule to the SGW to trigger the bearer activation process, the process from step 207 to step 210 is as follows. The SGW sends the access mode of the current network to the PCRF, and the PCRF sends the PCC rule corresponding to the access mode of the current network to the SGW and the PGW. After the bearer activation process is ended, the SGW initiates the bearer modifying process according to the PCC rule corresponding to the access mode of the current network.

The present disclosure is applicable to not only the bearer activation procedure in the embodiment, but also bearer modifying and deleting procedures, which are substantially similar to the bearer activation procedure and will not be further described here.

Figure 3A:
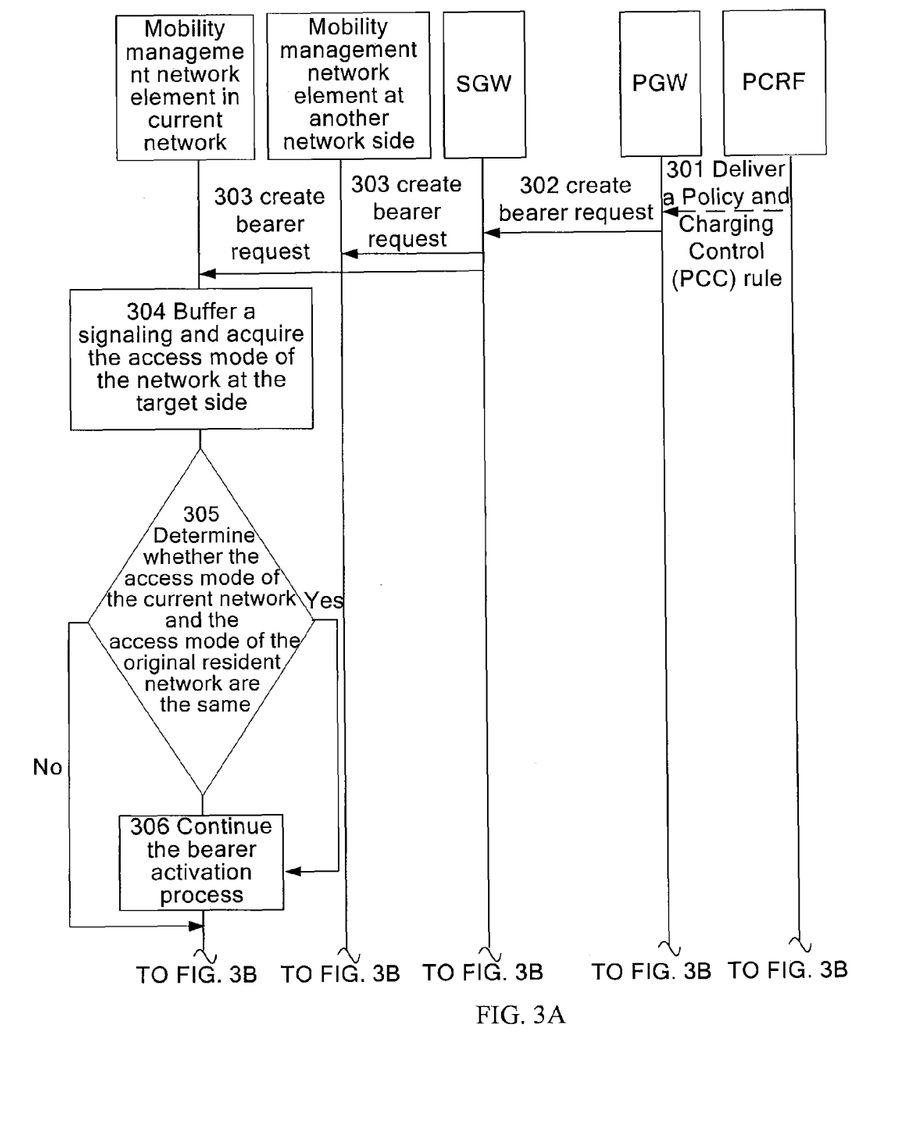
FIG. 3 is a signaling flow chart of a method for processing a bearer under an ISR mechanism according to a third embodiment.
Figure 3B:
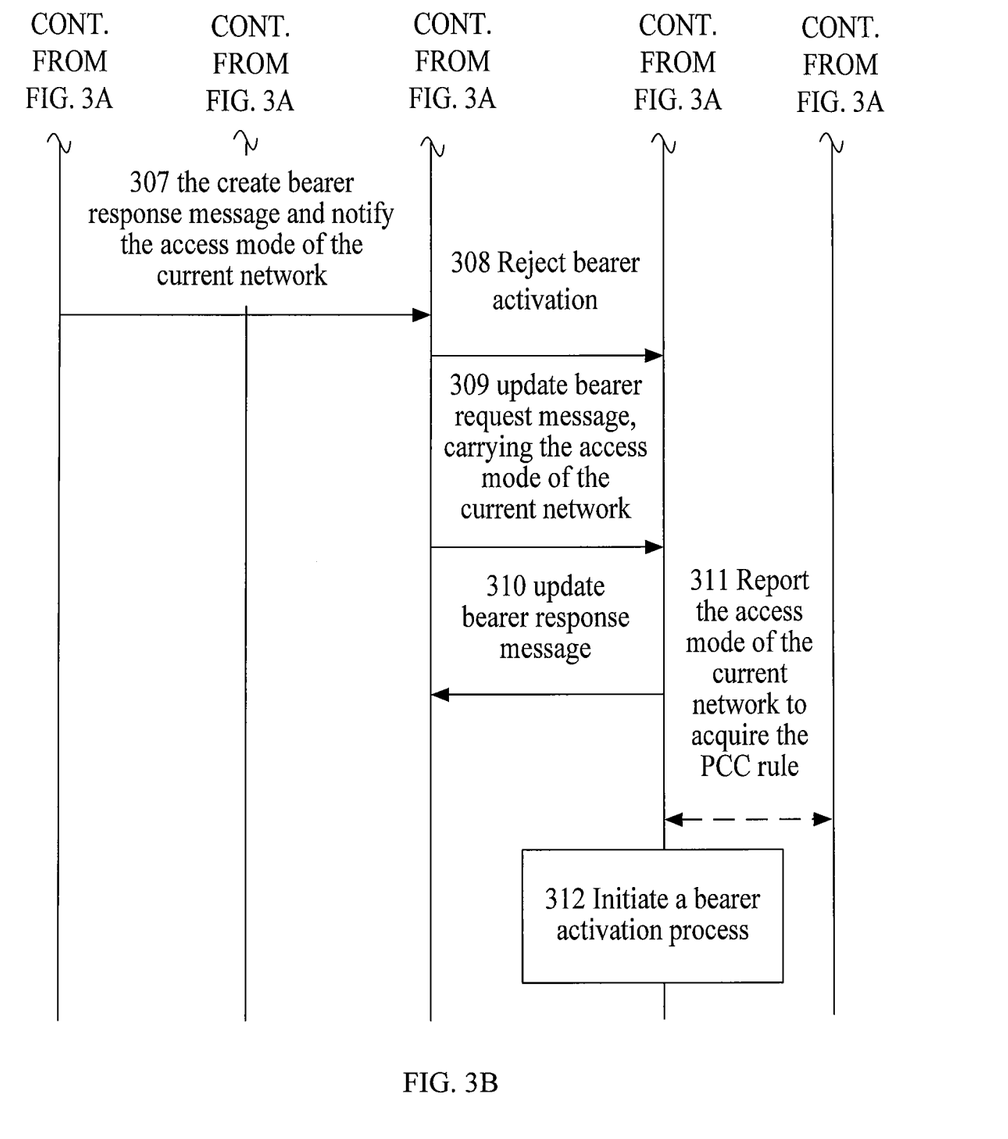

Referring to FIG. 3, a signaling flow chart of a method for processing a bearer under an ISR mechanism according to a third embodiment is shown. The bearer processing procedure may be a bearer initiating or processing procedure. This embodiment is still described according to the bearer activation procedure under the ISR mechanism. UE in an IDLE state is moved from an previous resident network to a current network.

In step 301, a PCRF delivers a PCC rule to a PGW.

The PCC rule is a PCC rule corresponding to an access mode of the previous resident network.

If the PCC rule is not configured by the PCRF, a QoS rule may also be configured by the PGW.

In step 302, the PGW sends, according to the acquired PCC rule, a create bearer request to an SGW.

Of course, the PCRF may also directly deliver the PCC rule to the SGW to trigger the bearer activation process, or the SGW configures the QoS rule.

In step 303, if the user is in an IDLE state in two access modes under the ISR mechanism, the SGW sends a create bearer request message to a mobility management network element in the current network and a mobility management network element in the previous resident network.

The message carries the access mode of the previous resident network recorded in the SGW.

In step 304, the mobility management network element in the current network and the mobility management network element in the previous resident network firstly store signaling and then page the user, and the access mode of the current network is acquired by paging the user.

The mobility management network element of the current network may also acquire the access mode of the current network by other means, for example, the mobility management network element of the current network sends a message of acquiring the access mode of the current network to the current network, and the current network returns a response message carrying the information of the access mode of the current network.

In step 305, the mobility management network element of the current network compares the acquired access mode of the current network with the access mode of the previous resident network carried in the message of the bearer request sent by the SGW to determine whether they are the same. If yes, the process proceeds to step 306; otherwise, the process proceeds to step 307.

In step 306, the mobility management network element extracts the stored create bearer request and continues the bearer activation process.

Since the bearer activation process is substantially the same as the bearer activation process in the prior art, it will not be described in detail here.

In step 307, the mobility management network element of the current network returns the create bearer response message to the SGW, which carries the access mode of the current network.

The mobility management network element of the current network may also send the access mode of the current network to the SGW by the update bearer request message.

In step 308, the SGW returns a response message for rejecting bearer activation to the PGW.

The response message for rejecting bearer activation may carry the access mode of the current network.

Specifically, the SGW may carry the access mode of the current network as a parameter in the response message for rejecting bearer activation and send it to the PGW. The response message for rejecting bearer activation may further carry a content indicating that the access mode of the current network is inconsistent with the access mode of the previous resident network recorded in the PGW, for example, indicating that the access mode stored in the PGW is inconsistent with the current access mode in the value of cause.

In step 309, the SGW sends an update bearer request message to the PGW, which carries the access mode of the current network.

Specifically, the SGW may carry the access mode of the current network as a parameter in the update bearer request message and send it to the PGW. The update bearer request message may further carry a content indicating that the access mode of the current network is inconsistent with the access mode of the previous resident network recorded in the PGW, for example, indicating that the access mode stored in the PGW is inconsistent with the current access mode in the value of cause.

When the SGW is connected to multiple PDNs, it sends the update bearer request message to multiple PGWs.

In step 310, the PGW returns an update bearer response message to the SGW.

In step 311, the PGW sends the access mode of the current network to the PCRF, and acquires the PCC rule corresponding to the access mode of the current network from PCRF.

In step 312, the PGW initiates a bearer activation process according to the acquired PCC rule corresponding to the access mode of the current network.

If, in steps 301-302, the PCRF directly delivers the PCC rule to the SGW to trigger the bearer activation process, the process from step 308 to step 312 is as follows. The SGW sends the access mode of the current network to the PCRF, and the PCRF sends the PCC rule corresponding to the access mode of the current network to the SGW and the POW. The SGW initiates the bearer activation process according to the acquired PCC rule corresponding to the access mode of the current network.

The present disclosure is applicable to not only the bearer activation procedure in the embodiment, but also bearer modifying and deleting procedures, which are substantially similar to the bearer activation procedure and will not be further described here.

Figure 4:
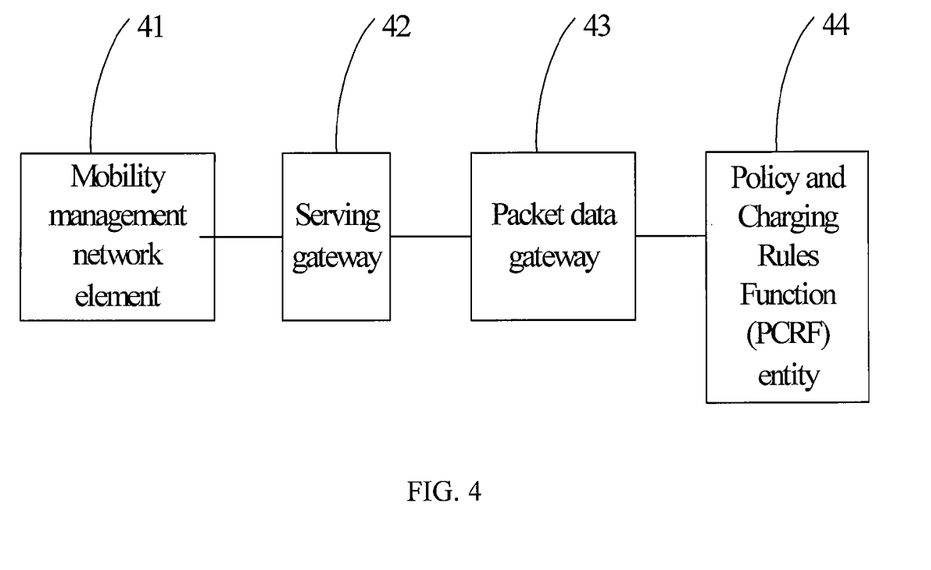
FIG. 4 is a schematic structural view of a mobile network system according to an embodiment.

Referring to FIG. 4, a schematic structural view of an embodiment of a mobile network system is shown.

The mobile network system includes a mobility management network element 41, an SGW 42, a PGW 43, a PCRF entity 44.

The mobility management network element 41 is configured to acquire an access mode of a current network, which may be an MME or an SGSN.

The SGW 42 is configured to acquire the access mode of the current network from the mobility management network element 41, and perform a bearing process according to the access mode of the current network.

The PCRF entity 44 is configured to receive the access mode of the current network sent by the SGW 42 and provide a PCC rule corresponding to the access mode of the current network for the SGW 42 or the PGW 43.

The PGW 43 is configured to send the access mode of the current network acquired by the SGW 42 to the PCRF entity 44, and initiate a bearing process according to the PCC rule corresponding to the access mode of the current network provided by the PCRF entity 44.

Figure 5:
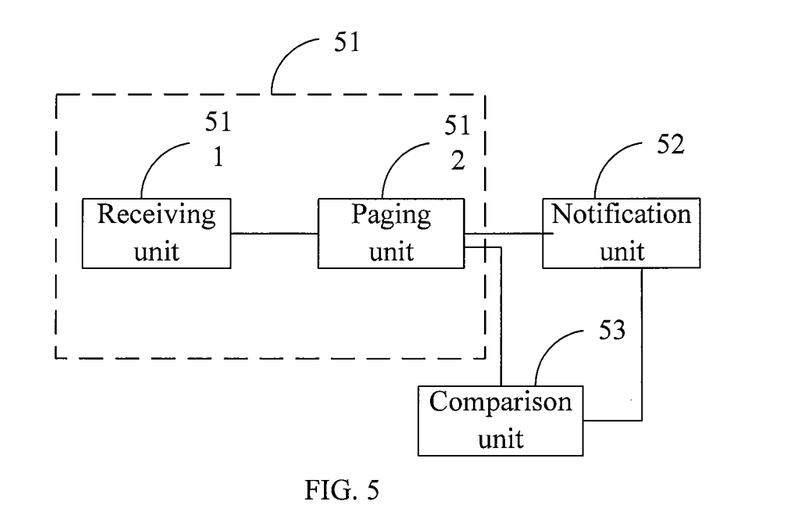
FIG. 5 is a schematic structural view of a mobility management network element according to an embodiment.

Referring to FIG. 5, a schematic structural view of an embodiment of a mobility management network element is shown.

The mobility management network element includes an acquisition unit 51, a notification unit 52, and a comparison unit 53.

The acquisition unit 51 is configured to acquire the access mode of the current network.

The notification unit 52 is configured to notify the SGW of the access mode of the current network acquired by the acquisition unit 51.

The acquisition unit 51 includes a receiving unit 511 and a paging unit 512.

The receiving unit 511 is configured to receive a bearer request initiated by the SGW or receive a notification message of paging a user initiated by the SGW.

The paging unit 512 is configured to initiate a user paging according to the bearer request or the notification message of paging a user received by the receiving unit 511, and acquire the access mode of the current network through the user paging.

The comparison unit 53 is configured to compare the access mode of the current network with the access mode of the previous resident network. When the comparison result indicates that the access mode of the current network is different from the access mode of the previous resident network, the notification unit 52 notifies the SGW of the access mode of the current network.

The mobility management network element further includes a storage unit.

The storage unit is configured to store the bearer request received by the receiving unit.

Figure 6:
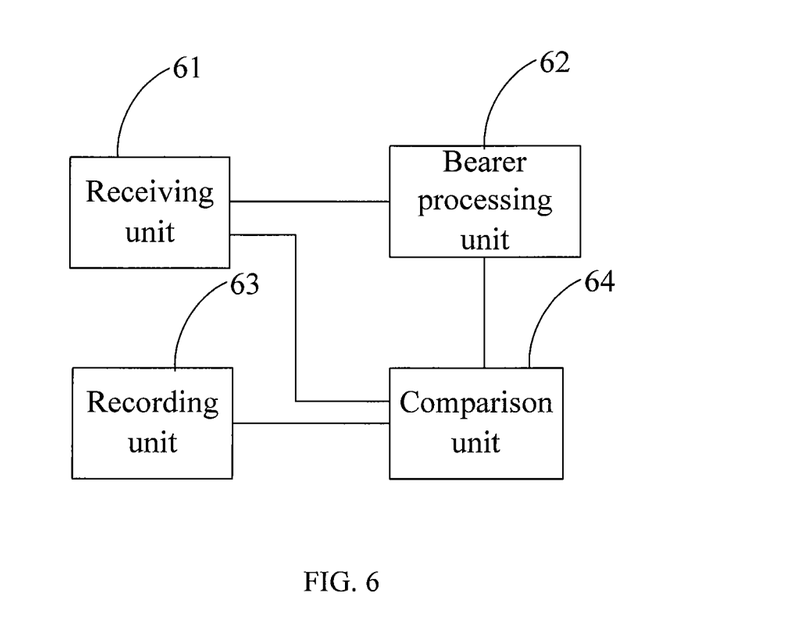
FIG. 6 is a schematic structural view of an SGW according to an embodiment.

Referring to FIG. 6, a schematic structural view of an embodiment of an SGW is shown.

The SGW includes a receiving unit 61, a bearer processing unit 62, a recording unit 63, and a comparison unit 64.

The receiving unit 61 is configured to receive the access mode of the current network sent by the mobility management network element.

The bearer processing unit 62 is configured to perform bearer processing according to the access mode of the current network received by the receiving unit 61.

The recording unit 63 is configured to record the access mode of the previous resident network.

The comparison unit 64 is configured to compare the access mode of the current network received by the receiving unit 61 with the access mode of the previous resident network recorded by the recording unit 63. When the comparison result indicates that the access mode of the current network is different from the access mode of the previous resident network, the bearer processing unit 62 performs bearer processing according to the access mode of the current network received by the receiving unit 61.

The SGW can further include a bearer request receiving unit and a sending unit.

The bearer request receiving unit is configured to receive the bearer quest sent by the PGW.

The sending unit is configured to notify the mobility management network element to page a user.

The SGW may further include a notification unit.

The notification unit is configured to notify the PGW of the access mode of the current network received by the receiving unit.

Through the method for processing a bearer under an ISR mechanism, the mobile network system, the mobility management network element, the SGW provided in the embodiments, the mobility management network element firstly acquires the access mode of the current network and notifies the SGW of the acquired access mode, and the SGW then performs the bearing procedure according to the acquired access mode of the current network. Therefore, the problem that the access mode to which the PCC policy adopted by the network side directed during a bearing procedure is inconsistent with the access mode of the current network can be avoided, which is caused because the network cannot know the access technique of the current network.

The method for processing a bearer under an ISR mechanism is introduced above in detail. It is understood that persons of ordinary skill may make variations to the described embodiments with departing from the scope of the claims. Moreover, it is understood that the scope of the claims is not limited to any particular embodiment, described above.

What is claimed is:

1. A method for processing a bearing procedure under an idle mode signaling reduction (ISR) mechanism, comprising:
    receiving a bearer request or a notification message for paging a user equipment (UE) from a serving gateway (SGW);
    based on the received bearer request or the notification message, initiating paging the UE to acquire an access mode of a current network;
    thereafter, acquiring the access mode of the current network; and
    notifying the SGW of the access mode of the current network, so that the SGW performs a bearer processing according to the access mode of the current network.

2. The method according to claim 1, wherein the bearer request carries an access mode of an previous resident network, and after acquiring the access mode of the current network, the method comprises:
    comparing the access mode of the current network with the access mode of the previous resident network;
    determining that the access mode of the current network is different from the access mode of the previous resident network; and
    notifying the SGW of the access mode of the current network.

3. A method for processing a bearing procedure under an idle mode signaling reduction (ISR) mechanism, comprising:
    receiving a bearer request sent by a packet data network gateway (PGW);
    after receiving the bearer request, notifying a mobility management network element to page a user equipment;
    thereafter, receiving an access mode of a current network sent by the mobility management network element; and
    performing a bearer processing according to the access mode of the current network.

4. The method according to claim 3, wherein after receiving the access mode of the current network, the method comprises:
    comparing the access mode of the current network with a recorded access mode of an previous resident network;
    determining that the access mode of the current network is different from the recorded access mode of the previous resident network; and
    thereafter, performing the bearer processing according to the access mode of the current network.

5. The method according to claim 3, wherein the performing the bearer processing according to the access mode of the current network comprises:
    sending the access mode of the current network to a policy and charging rules function (PCRF) entity;
    acquiring a policy and charging control (PCC) rule corresponding to the access mode of the current network from the PCRF entity; and
    sending a create bearer request corresponding to the access mode of the current network according to the PCC rule corresponding to the access mode of the current network.

6. The method according to claim 3, wherein the performing the bearer processing according to the access mode of the current network comprises:
    sending the access mode of the current network to a policy and charging rules function (PCRF) entity;
    acquiring a policy and charging control (PCC) rule corresponding to the access mode of the current network from the PCRF entity; and
    sending a bearer modifying request corresponding to the access mode of the current network according to the acquired PCC rule corresponding to the access mode of the current network.

7. The method according to claim 3, wherein after receiving the access mode of the current network, the method further comprises:
    notifying the PGW of the access mode of the current network; and
    receiving a bearer request corresponding to the access mode of the current network sent by the PGW according to a policy and charging control (PCC) rule corresponding to the access mode of the current network.

8. A mobile network system, comprising:
    a mobility management network element configured to acquire an access mode of a current network; and
    a serving gateway (SGW) configured to acquire the access mode of the current network from the mobility management network element, and perform a bearing procedure according to the access mode of the current network.

9. The mobile network system according to claim 8, further comprising:
    a policy and charging rules function (PCRF) entity configured to receive the access mode of the current network, and send a policy and charging control (PCC) rule corresponding to the access mode of the current network to the SGW.

10. The mobile network system according to claim 9, further comprising:
    a packet data network gateway (PGW) configured to send the access mode of the current network to the PCRF entity, and initiate a bearing procedure according to the PCC rule corresponding to the access mode of the current network.

11. A mobility management network element, comprising:
a receiving unit configured to receive a bearer request or a notification message for paging a user equipment (UE) from a serving gateway (SGW);
a paging unit configured to initiate paging the UE to obtain an access mode of a current network according to the bearer request or the notification message for paging the UE received by the receiving unit;
an acquisition unit configured to obtain the access mode of the current network; and
a notification unit configured to notify the SGW of the access mode of the current network acquired by the acquisition unit.

12. The mobility management network element according to claim 11, wherein the bearer request received by the receiving unit carries an access mode of an previous resident network, and the mobility management network element further comprises:
a comparison unit configured to compare the access mode of the current network with the access mode of the previous resident network.

13. A serving gateway (SGW), comprising:
a bearer request receiving unit configured to receive a bearer request sent by a packet data network gateway (PGW);
a sending unit configured to notify a mobility management network element to page a user equipment (UE);
a receiving unit configured to receive an access mode of a current network sent by the mobility management network element; and
a bearer processing unit configured to perform a bearer processing according to the access mode of the current network received by the receiving unit.

14. The SGW according to claim 13, further comprising:
a recording unit configured to record an access mode of an previous resident network; and
a comparison unit configured to compare the access mode of the current network received by the receiving unit with the access mode of the previous resident network recorded in the recording unit,
wherein when a comparison result indicates that the access mode of the current network is different from the access mode of the previous resident network, the bearer processing unit performs the bearer processing according to the access mode of the current network received by the receiving unit.

15. The SGW according to claim 13, further comprising:
a notification unit configured to notify the PGW of the access mode of the current network received by the receiving unit.

* * * * *